Patented Apr. 28, 1936

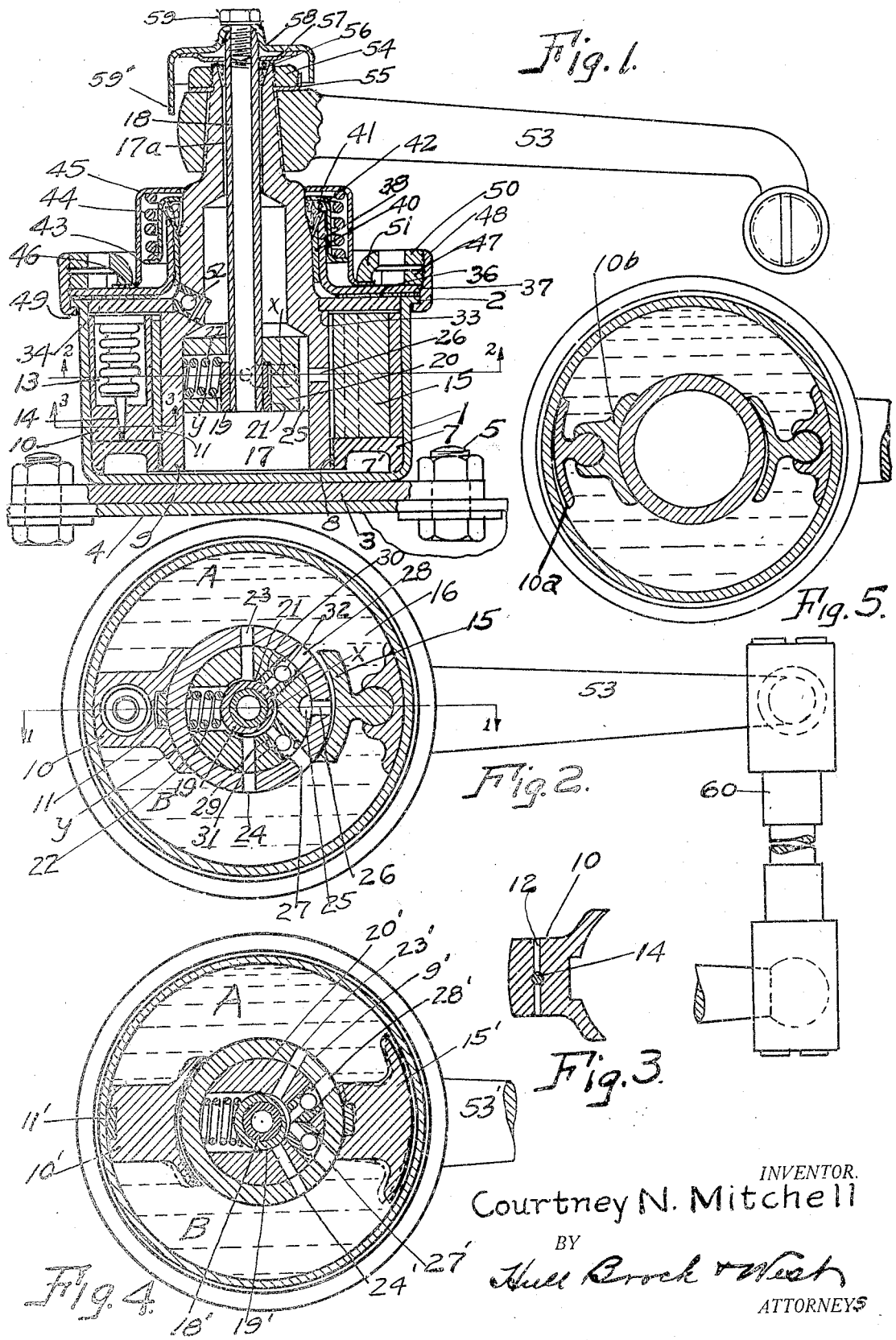

2,038,587

UNITED STATES PATENT OFFICE 2,038,587

HYDRAULIC SHOCK ABSORBER

Courtney N. Mitchell, Berea, Ohio, assignor to Houde Engineering Corporation, Buffalo, N. Y., a corporation of New York Application July 11, 1928, Serial No. 291,828
Renewed February 23, 1934

21 Claims. (Cl. 188—89)

This invention relates to a hydraulic shock absorber and more particularly to that class of shock absorbers adapted for use with motor vehicles, although the apparatus is of general application.

The main object of the invention is to provide a shock absorber for retarding relative movement between two movable members and which due to its peculiar construction is readily adapted for adjustment to compensate for irregularities in the working parts and also well adapted for quantity production at comparatively low cost.

Another object of the invention is to provide a shock absorber in which the oscillating piston is reversed from the construction shown in my copending application Serial No. 271,352 filed April 19, 1928, issued into Patent No. 1,942,658, dated January 9, 1934, so as to reduce the total relative travel of the piston.

A further object of the invention is to provide a means of by-passing the liquid from one side of the piston to the other through an adjustable valve without the liquid passing into the reservoir adjacent to the working compartment and thus to avoid fluctuations of pressure in the reservoir.

A further object of the invention is to provide a piston or plunger which has a passageway therethrough and in which is arranged a thermostatically controlled valve having a very sensitive adjustment to compensate for variations in viscosity of the liquid resulting from changes in temperature.

A still further object of the invention is to provide a shock absorber of the character described which is provided with means for flexing the cover of the same inwardly to vary the clearance between the piston and the casing.

A still further object of the invention is to provide a shock absorber in which the piston is so connected with the shaft as to permit a slight oscillatory movement thereof with respect to the shaft so as to compensate for manufacturing irregularities, thus rendering it unnecessary to fit the working parts accurately.

Further and more limited objects of the invention will appear as the description proceeds and by reference to the accompanying drawing in which Fig. 1 is a horizontal view taken on the line 1—1 of Fig. 2; Fig. 2 is a vertical sectional view on the line 2—2 of Fig. 1; Fig. 3 is a horizontal sectional view on the line 3—3 of Fig. 1 and disclosing the port through the piston which is controlled by the thermostatically controlled valve; Fig. 4 is a vertical sectional view similar to Fig. 2 and disclosing a modification of my invention and Fig. 5 is a vertical sectional view illustrating the second modification of the invention.

Referring now to the drawing, reference character 1 designates a cup shaped casing or housing having an overhanging peripheral flange 2 and which is welded to a bracket 3 for attaching the casing to a frame member 4 on which the unit is to be mounted and which is secured thereto by bolts 5. Non-rotatably secured within the casing at the inner end thereof is an annular member 7 which is channel shaped in section and provided with a bearing 8 in which the inner end of a hollow shaft 9 is journaled. Also arranged within the casing is an abutment or block 10 which is keyed to shaft 9 by means of a key 11 and which serves as a piston upon relative movement of the shaft and casing. The block or piston 10 is shaped as shown most clearly in Fig. 3 and has a passageway 12 extending therethrough. The fit of the key 11 in the keyway is such as to permit a slight wobbling or oscillatory movement of the piston with respect to the shaft to allow for irregularities in manufacture of the piston, shaft or casing.

Formed in the piston 10 is a chamber 13 in which is arranged a thermostatically controlled needle valve 14 which valve is adapted to be moved by a thermostat bellows upon changes in the temperature thereby to automatically control the valve for variations in the viscosity of the liquid due to changes in temperature. Trunnioned to the side wall of the casing on an axis parallel with but spaced from the axis of the shaft 9, is a double acting vane 15 which bears against the outer periphery of the hollow shaft 9 and which has a limited oscillatory movement with respect thereto. This vane is located approximately 180 degrees from the abutment or piston 10 when the parts are in their normal position. The hollow shaft 9 arranged within the casing as described provides an annular compression chamber 16 and a central chamber or reservoir 17 both of which are adapted to be filled with a viscous liquid, such as glycerine or castor oil.

The hollow shaft 9 is provided with an opening 17ᵃ through which extends a preferably tubular stem member 18 to the lower end of which is secured a sleeve forming a cylindrical valve member 19, this valve member on one side having the circumferentially extending port or channel x of variable depth. Secured in the lower end of the shaft is the block or bushing 20 having in its lower portion a cylindrical recess 21 forming a valve chamber for the valve member 19. In a radially extending recess y in the bushing 20 there is a spring 22 which presses against the valve member tending to hold its ported side intimately against the adjacent surface of the valve chamber 21. Extending from the valve chamber radially through the bushing and cam are the passageways 23 and 24 which at their outer ends communicate at all times with the hydraulic working chambers A and B, respectively. The bushing has a longitudinally extending passage 25 therethrough communicating with a passageway 26 through the shaft and terminating at a point midway between the ends of the vane 15 when the piston is in its mid position as shown in Figure 2. Between the passages 24 and 26, a passage 27 extends radially through the shaft and the bushing 20 to connect with the valve chamber, the outer end of the passage 27 being partially outside the adjacent end of the vane 15 when the piston is in mid position. Between the passages 23 and 26, a passage 28 extends through the shaft and bushing to connect with the valve chamber, the outer end of the passage being partially outside of the adjacent end of the vane 15 when the piston is in mid position. In the passages 27 and 28 are arranged thimbles 29 and 30, respectively, having check valves 31 and 32 therein which seat inwardly, as best shown in Figure 2.

The shaft 9 is provided with an annular shoulder 33 and fitting over this shoulder and closing the end of the chamber 16 is a disk 34. In order to prevent leakage of liquid from the chamber 16 and to provide for adjustment of the disk 34, I provide annular gasket and thrust washer 36 over which is placed a cover 37 which just fits the top of the casing and is provided with an annular flange 38 which surrounds the upper end of the hollow shaft 9. Pressed within the flange 38 and bearing against the hollow shaft 9 is a metal bushing 40 and packing 41 which serve to prevent leakage around the shaft. The bushing 40 and packing 41 are held in place by means of a cap 42 having a peripheral flange 43 which is held in place by a coil spring 44 the inner end of which bears against the flange 43 and the upper end of which bears against a cover 45 fitting over the shaft 9 and which is provided with a peripheral flange 46 which rests on the cover 37.

For the purpose of tightly sealing the casing and holding the parts in place I provide an exteriorly threaded ring member 47 which rests on and bears against the cover 37 and has threaded engagement with an interiorly threaded ring member 48 having an inner peripheral flange 49 which engages under the flange 2 on the casing. Positioned over the ring member 47 is an annular member 50 which is threadedly secured to the ring member 47 and provided with a flange 51 which extends over and bears against peripheral flange 46 on cover 45. The small amount of liquid which may escape past disk 34 is held within the space below the metal bushing 38 and may drain past outwardly seating check valve 52 back into the hollow shaft 9. Nonrotatably connected with the outer end of the shaft 9 is a lever arm 53 by means of which the shaft 9 is turned with respect to the casing. The lever arm 53 is held in place by a nut 54 and washer 55.

For the purpose of preventing leakage around the upper end of the valve stem 18, packing 56 is provided which is held in place by a resilient washer 57 welded on a cap 58 which is non-rotatably secured on the stem 18 and held thereon by a screw 59 threading it to the stem. By turning the stem 18, the valve member 19 may be manually adjusted to set the port $x$ with respect to the ports or passages 23, 24, 27 and 28, which connect with the valve chamber. The cap 58 is provided with a projecting portion or pointer 59′ which projects downwardly over the end of the lever arm 53, and this surface may be provided with a suitable scale to enable the valve stem to be set to the proper position. The casing 1 is preferably attached to the vehicle body, and the arm 53 is connected to the vehicle axle by means of a universal adjustable connecting link 60.

Describing now the operation, Figures 1 and 2 show the various parts in normal position. Upon downward movement of the vehicle body and compression of the vehicle springs, the shaft 9 with the piston thereon is rotated in counter-clockwise direction to displace the fluid from the working chamber B. The pressure in chamber B, acting against the vane member 15, will hold the vane member 15 with its lower end against the shaft and its upper end displaced therefrom. Part of the displaced fluid will flow from chamber B to chamber A through the passageway afforded between the sides of the piston and vane and the disk 34, the size of this passageway having been adjusted by means of the ring 50 bearing against the disk. Fluid will also flow from the chamber B through passageway 24 and the valve port $x$ and past the check valve 32 and through passageway 28 into chamber A. Replenishing fluid will flow into chamber A from the reservoir 17 through passageways 25 and 26.

During rebound movement of the vehicle springs, the shock absorber shaft and piston will rotate in clockwise direction, and the pressure generated in chamber A will swing the vane 15 with its upper end against the shaft and to expose the passage 26 to the chamber B. As the valve port $x$ is not exposed to the passageway 23, there can be no flow of displaced fluid from chamber A to chamber B past the valve 19, and therefore the flow is restricted to the passageway afforded between the sides of the piston and vane and the disk 34, the rebound shock absorber resistance thus being greater than the resistance to vehicle spring compression. Replenishing fluid will flow into chamber B from the reservoir 17 through passageways 25 and 26.

The shock absorber shown in Figures 1 and 2 is set for mounting on the body at the front and left side of a vehicle chassis, with the lever 53 extending forwardly for connection to the axle. To adapt the shock absorber for application to the opposite side of the vehicle, all that is necessary is adjustment of the valve 19 by rotation of its stem 18 to bring the valve port $x$ for connection between the passage 23 and the check valve passage 27, and disconnection of the passage 24 from the valve port. Then, during compression of the vehicle springs, the fluid will be displaced from chamber A through the passage 23, the valve port $x$, and the passage 27 past the check valve 31, and during rebound of the springs there can be no flow through the valve port $x$, as the passage 24 is closed by the valve, and the flow will have to be through the passageway afforded between the sides of the piston and vane and the disk 34.

A slight clearance is provided in the valve bore or chamber 21, which clearance is normally taken up by spring 22 to hold the ported side of the valve for intimate communication with the various passageways through the shaft and bushing 20; but under abnormal pressure the spring 22 will yield so that there will be sufficient leakage past the valve to dissipate the abnormal pressure and prevent injury to the shock absorber. Such lateral movement of the valve and its stem is permitted by the yielding connection of the stem with the outer end of the shaft.

The annular bearing member 7 provides an auxiliary reservoir 7' which communicates with the main reservoir 17 within the shaft.

Since the temperature of the liquid materially affects its viscosity and the resulting resistance to flow, I have provided automatic means for relieving excessive pressure under varying temperature conditions. This means embodies the thermostatically controlled valve 14, the needle valve 14 being disposed in the passageway 12 in the abutment or piston 10. When the temperature decreases, the bellows contracts to partially withdraw the needle valve from the passageway so as to permit flow therethrough.

In Fig. 4 there is disclosed a modified form of my invention in which the abutment 10' is secured to the wall of the casing by means of a key 11', the key being of such size as to permit a slight wobbling or oscillatory movement of the abutment 10' with respect to the casing. In this form of invention, the vane 15 is replaced by a piston 15' which is keyed to the shaft 9' so as to permit a slight oscillatory movement of the piston 15 with respect to the shaft. This manner of mounting the abutment 10' and piston 15' allows for irregularities in the manufacture of the contiguous parts. In this form of invention, passageway 23' leads through the shaft 9' and block 20' and a similar passageway 24' is provided on the opposite side. In other respects this form of the invention is substantially the same as the preferred form hereinbefore described. Upon movement of the shaft 9' in a counterclockwise direction, the piston 15' will be moved into engagement with the wall of the casing, as shown in dotted lines in Fig. 4, and tend to increase the pressure within the chamber A. The liquid in the chamber A will flow through the passageway 23' past the valve member 19' and through the passageway 27' to the opposite side of the piston. It will therefore be seen that the liquid will pass from the chamber A into the chamber B without materially increasing the pressure within the hollow shaft, thereby decreasing the probability of leakage past and around the shaft. Upon movement of the shaft in the oppoiste direction, and the creation of pressure in chamber B, there can be no flow through the port valve 19', as the passage 24' is closed by the valve, and the fluid must therefore flow through the passage provided between the sides of the piston and vane and the disk 34.

In Fig. 5 there is disclosed a second modified form of my invention which is substantially identical with the form of the invention shown in Figs. 1 and 2 except that the abutment 10 is replaced by a member 10ª which is pivotally connected with a member 10ᵇ rigidly secured to the shaft.

It is to be understood that the various changes may be made in the shape, size and arrangement of the parts without departing from the spirit of my invention. It is also to be understood that either the casing or the shaft may be connected with the vehicle body and that it is immaterial whether the casing is rotated or the shaft rotated.

It will now be clear that I have provided a shock absorber which will accomplish the objects of the invention as hereinbefore stated and I wish my invention to be limited only in accordance with the scope of the appended claims.

Having thus described my invention, what I claim is:

1. A device for checking the movement between two relatively movable members comprising a casing adapted to be filled with a liquid, a shaft journaled in said casing, a vane carried by said casing and pivotally secured thereto on an axis spaced from and parallel with the axis of said shaft, and means for varying the clearance at the ends of said vane.

2. A device for retarding the movement between two relatively movable members comprising a casing, a shaft journaled in said casing and having an abutment thereon adapted to act as a piston, a vane pivotally mounted on said casing on an axis spaced from and parallel with said shaft, and means for varying the clearance at the ends of said vane.

3. A shock absorber comprising a casing adapted to be filled with a liquid, a shaft journaled in said casing, an abutment carried by said shaft and serving as a piston, said abutment being loosely keyed to said shaft so as to permit a limited oscillatory movement with respect thereto to compensate for manufacturing irregularities in the contiguous parts, a vane pivotally mounted on said casing and bearing against said shaft and having a slight oscillatory movement with respect thereto, and means for varying the clearance at the ends of said vane.

4. A shock absorber comprising a casing adapted to be filled with a liquid, a cover for said casing, a shaft journaled in said casing and projecting through said cover, a member mounted on said shaft and serving as a piston, said member being mounted so as to have a limited oscillatory movement with respect to said shaft so as to compensate for manufacturing irregularities, a vane carried by said casing and bearing against said shaft, the aforesaid piston having a limited oscillatory movement on a rectangular key member carried by said shaft.

5. A shock absorber comprising a casing adapted to be filled with a liquid, a cover for said casing, a shaft journaled in said casing and projecting through said cover, an abutment carried by said shaft and serving as a piston, said abutment having a limited movement with respect to said shaft to compensate for manufacturing variations, a vane carried by said casing and bearing against said shaft and having a slight oscillatory movement with respect thereto, and means for flexing said cover to vary the clearance between the piston and the casing, and means for varying the clearance at the ends of said vane.

6. In a shock absorber, a casing adapted to be filled with a liquid, a cover for said casing, a shaft journaled in said casing and cooperating therewith to form an annular compression chamber, an abutment carried by said shaft and serving as a piston, said abutment having a limited oscillatory movement with respect to said shaft to compensate for manufacturing variations of contiguous parts, a member pivotally mounted on said casing on an axis parallel with the axis of said shaft and traversing said compression chamber and bearing against said shaft, and means for varying the clearance at the ends of said vane.

7. In a shock absorber, a casing adapted to be filled with a liquid, a cover for said casing, a shaft journaled in said casing and cooperating therewith to form an annular compression chamber, an abutment carried by said shaft and serving as a piston, said abutment having a limited oscillatory movement with respect to said shaft to compensate for manufacturing variations of contiguous parts, a member pivotally mounted on said casing on an axis parallel with the axis of said shaft and traversing said compression chamber and bearing against said shaft, and means for moving said cover inwardly to vary the effective capacity of said compression chamber, and means for varying the clearance at the ends of said piston.

8. In a shock absorber, a casing adapted to be filled with a liquid, a cover for said casing, a hollow shaft journaled in said casing and cooperating therewith to form an annular compression chamber, an abutment carried by said shaft and serving as a piston, said abutment having a limited oscillatory movement with respect to said shaft to compensate for manufacturing variations of contiguous parts, a member pivotally mounted on said casing on an axis parallel with the axis of said shaft and traversing said compression chamber and bearing against said shaft, and means arranged within said shaft for regulating the flow of liquid from one side of said piston to the opposite side thereof upon relative movement of said casing and shaft, and means for varying the clearance at the ends of said piston.

9. A shock absorber comprising a casing adapted to be filled with a liquid, a cover for said casing, a shaft journaled in said casing and projecting through said cover, an abutment carried by said shaft and serving as a piston, said abutment having a limited movement with respect to said shaft to compensate for manufacturing variations, a vane carried by said casing and bearing against said shaft and having a slight movement with respect thereto, said abutment and said vane dividing an annular space within said casing into two working compartments, and means for regulating the flow of fluid through a passage connecting said compartments, said means comprising a cylindrical valve fitting into a cylindrical recess with working clearance, said valve being adapted to close a passage through the aforesaid shaft, and resilient means adapted to hold said valve in normal axial position.

10. A shock absorber comprising a casing adapted to be filled with a liquid, a cover for said casing, a shaft journaled in said casing and projecting through said cover, an abutment carried by said shaft and serving as a piston, said abutment having a limited movement with respect to said shaft to compensate for manufacturing variations, a vane carried by said casing and bearing against said shaft and having a slight movement with respect thereto, said abutment and said vane dividing an annular space within said casing into two working compartments, and means for regulating the flow of fluid through a passage connecting said compartments, said means comprising a cylindrical valve fitting into a cylindrical recess with working clearance, said valve being adapted to close a passage through the aforesaid shaft, and resilient means adapted to hold said valve in normal axial position.

11. In a shock absorber, a casing adapted to be filled with a liquid, a cover for said casing, a hollow shaft journaled in said casing and cooperating therewith to form an annular compression chamber, an abutment carried by said shaft and serving as a piston, said abutment having a limited movement with respect to said shaft to compensate for manufacturing variations of contiguous parts, a member pivotally mounted in said casing on an axis parallel with the axis of said shaft and traversing said compression chamber and bearing against said shaft, and means for varying the clearance at the ends of said abutment and vane.

12. In a shock absorber, a casing adapted to be filled with a liquid, a cover for said casing, a hollow shaft journaled in said casing and cooperating therewith to form an annular compression chamber, an abutment carried by said shaft and serving as a piston, said abutment having a limited movement with respect to said shaft to compensate for manufacturing variations of contiguous parts, a member pivotally mounted on said casing on an axis parallel with the axis of said shaft and traversing said compression chamber and bearing against said shaft, and means for moving said cover inwardly to vary the effective capacity of said compression chamber.

13. In a shock absorber, a casing adapted to be filled with a liquid, a cover for said casing, a shaft journaled in said casing and cooperating therewith to form an annular compression chamber, an abutment carried by said shaft and serving as a piston, said abutment having a limited movement with respect to said shaft to compensate for manufacturing variations of contiguous parts, a member pivotally mounted on said casing on an axis parallel with the axis of said shaft and traversing said compression chamber and bearing against said shaft, and means arranged within said shaft for regulating the flow of liquid from one side of said piston to the opposite side thereof upon relative movement of said casing and shaft, and means for varying the clearance at the end of said piston and abutment.

14. A device for checking the movement between two relatively movable members and comprising a casing adapted to contain a liquid, a shaft journaled in said casing, a vane carried by said casing and pivotally secured thereto on an axis spaced from and parallel with the axis of said shaft, and means for varying the clearance at the opposite ends of said piston and vane.

15. In a hydraulic check comprising a casing, a hollow shaft journaled in said casing, a piston connected with said shaft, an abutment in said casing and dividing the space in said casing into a pair of working compartments, a cover for said casing, an opening in said cover serving as a bearing for said shaft, a reservoir for supplying fluid to the working compartments, a bushing within said shaft, said bushing having a cylindrical opening therein, and a valve fitting into said opening with working clearance, said valve having an axial bore and having its outer part machined to provide a passage, said last named passage being in communication with a passage through a part of said shaft.

16. In a hydraulic check comprising a casing, a hollow shaft journaled in said casing, a piston connected with said shaft, an abutment in said casing and dividing the space in said casing into working compartments, a cover for said casing, an opening in said cover serving as a bearing for said shaft, an annular reservoir surrounding said shaft and contained wholly within the casing, said reservoir connected with a working compartment, passages between the aforesaid compartments, valve means for controlling the flow of liquid in said passages, said valve means comprising an adjustable rotary member and a thermostatically controlled axially moving member.

17. In a hydraulic check comprising a casing, a rotatable shaft journaled in said casing, a piston connected with said shaft, an abutment in said casing and dividing the space in said casing into working compartments, a cover for said casing, an opening in said cover serving as a bearing for said shaft, an annular reservoir surrounding said shaft and contained wholly within the casing, a passage between the working compartments, a valve in said passage, and a thermostatic element adapted to move said valve axially.

18. In a hydraulic check, the combination of a casing, a shaft and piston unit adapted to rotate in said casing, a stationary element anchored in said casing and traversing the space between said casing and a part of said shaft and piston unit, said unit having a bore, a cylindrical valve fitting into said bore with working clearance, said valve being adapted to be rotated to regulate the flow of fluid within the casing, resilient means for holding said valve in axial position, and a thermostatic valve controlling element contained within said shaft and piston unit.

19. In a hydraulic shock absorber, a casing for containing hydraulic fluid, a hollow shaft journalled in said casing and forming a fluid reservoir, a piston carried by said shaft to displace the fluid in said casing, a vane structure extending between the shaft and casing walls and comprising a member attached to the casing wall and a vane trunnioned thereto for oscillatory movement, the oscillatory movement of said vane being limited by the engagement of its ends with said shaft, and a passage formed through said shaft for connecting the interior thereof with the space between said oscillatory vane and the shaft.

20. In a hydraulic check, the combination of a casing, a shaft and piston unit adapted to rotate in said casing, a stationary element anchored in said casing and traversing the space between said casing and a part of said shaft and piston unit, said unit having a bore and a bushing in said bore providing a cylindrical valve chamber, a cylindrical valve fitting into said cylindrical chamber with working clearance and having a port extending circumferentially along one side thereof for cooperating with passageways through said bushing and shaft, and resilient means within said bushing engaging said valve to yieldably hold it with its ported side in registration with said passageways through said bushing and shaft.

21. In a shock absorber comprising a casing adapted to be filled with a liquid, a cover for said casing, a shaft journaled in said casing and projecting through said cover, a piston member mounted on said shaft so as to have a limited movement with respect to said shaft in order to compensate for manufacturing irregularities, a member carried by said casing and bearing against said shaft and having a limited movement with respect to said casing whereby to compensate for manufacturing irregularities in the contiguous parts, said piston member having a recess therein for an axially movable thermostat valve.

COURTNEY N. MITCHELL.